US008850418B2

(12) United States Patent
Kemmler et al.

(10) Patent No.: US 8,850,418 B2
(45) Date of Patent: Sep. 30, 2014

(54) SYSTEM AND METHOD FOR BUSINESS FUNCTION REVERSIBILITY

(75) Inventors: Andreas Kemmler, Bönnigheim (DE); Torsten Kamenz, Wiesloch (DE)

(73) Assignee: SAP AG, Walldorf (DE)

( * ) Notice: Subject to any disclaimer, the term of this patent is extended or adjusted under 35 U.S.C. 154(b) by 373 days.

(21) Appl. No.: 12/911,245

(22) Filed: Oct. 25, 2010

(65) Prior Publication Data
US 2012/0102360 A1    Apr. 26, 2012

(51) Int. Cl.
G06F 9/44    (2006.01)
G06F 9/445    (2006.01)
G06F 11/36    (2006.01)

(52) U.S. Cl.
CPC .............. *G06F 8/65* (2013.01); *G06F 11/3688* (2013.01); *G06F 11/3664* (2013.01)
USPC ........... 717/168; 717/124; 717/125; 717/170; 717/172

(58) Field of Classification Search
USPC .......................... 717/168, 170, 172, 124, 125
See application file for complete search history.

(56) References Cited

U.S. PATENT DOCUMENTS

| 2002/0138595 | A1* | 9/2002 | Ruellan et al. ................ 709/219 |
| 2006/0026586 | A1* | 2/2006 | Remmel et al. ............... 717/170 |
| 2006/0195839 | A1* | 8/2006 | Lin et al. ........................ 717/174 |
| 2006/0271640 | A1* | 11/2006 | Muldoon et al. ............. 709/217 |
| 2008/0140475 | A1* | 6/2008 | Li et al. ............................. 705/7 |
| 2009/0295461 | A1* | 12/2009 | Cesare et al. ................. 327/524 |

OTHER PUBLICATIONS

Yash Jonnalagadda, "SAP Enhancement and Switch Framework", 2008.*
Schaffry ("SAP.info: Enhancing the ERP Core without Modifications (Part 2)"), Jan. 16, 2008.*

* cited by examiner

*Primary Examiner* — Chat Do
*Assistant Examiner* — Jae Jeon
(74) *Attorney, Agent, or Firm* — Kenyon & Kenyon LLP

(57) ABSTRACT

The invention may provide "undo" (e.g., rollback) features, along with data management simplification features, to an update package model of software suite development/evolution. New functions, which may have disruption effects for customers, may be installed into the core configuration data with inactive switches. Upon activation, a switch status may change, and a query filter may use the activated function (e.g., as associated with the switch ID). Original functions may be maintained, giving the user the ability to deactivate an activated function, and thereby reverting the system back to the prior configuration status.

12 Claims, 3 Drawing Sheets

SYSTEM AND METHOD FOR BUSINESS FUNCTION REVERSIBILITY

BACKGROUND

Business entities require business software for performing an array of essential tasks. Communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may be controlled by a set of customization data that is specific to each unique customer. Unlike the companies transactional data, which may include millions of data records or more, the configuration and customization data may represent a very small and rarely changing set of data. This data may modify, instantiate, activate, or otherwise implement the provided tools, in a customer specific manner. With the configuration data, customers may be able to modify every aspect of their software experience, including defining the user interfaces, what functions are available on the interfaces, and/or what fields are provided to the user.

To help maintain these software packages, SAP® AG introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A development team may use enhancement packages to quickly and easily deliver business and industry-specific functionality, enterprise services, and other functions that help improve and simplify the use of software through user interfaces and other end-to-end process improvements.

These enhancement packages may be cumulative from a functional perspective, e.g., current enhancement packages may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use.

In some solutions it may be that new functionality must be explicitly switched on to become active/visible in the system. A unit within an enhancement package which can be activated/switched on may be referred to as a "business function." Activating a business function may trigger switches, which then may influence the execution of the code enhancements. These switches may ensure that customers only see, feel, or can make use of the new functionality if they have activated them. The activation process may additionally start a job in the overall system that automatically performs all the needed changes in the system.

Embodiments of the present invention concern further improvements in the enhancement package model. Currently, by virtue of the switch framework, the delivery of enhancement packages does not cause disruption, and customers may select only those functions they want, limiting disruption to those specific enhancements. However, the enhancements often overwrite configuration data, adding functions, changing functions, deleting/replacing functions, etc. The disruption to the system caused by these activations cannot easily be assessed before installation, and there may be no way to reverse the installation in a cost/time effective manner. Thus, example embodiments of the present invention relate to additional procedures, functions, and systems for facilitating a reversal of enhancement activations.

DETAILED DESCRIPTION

Figure 1:
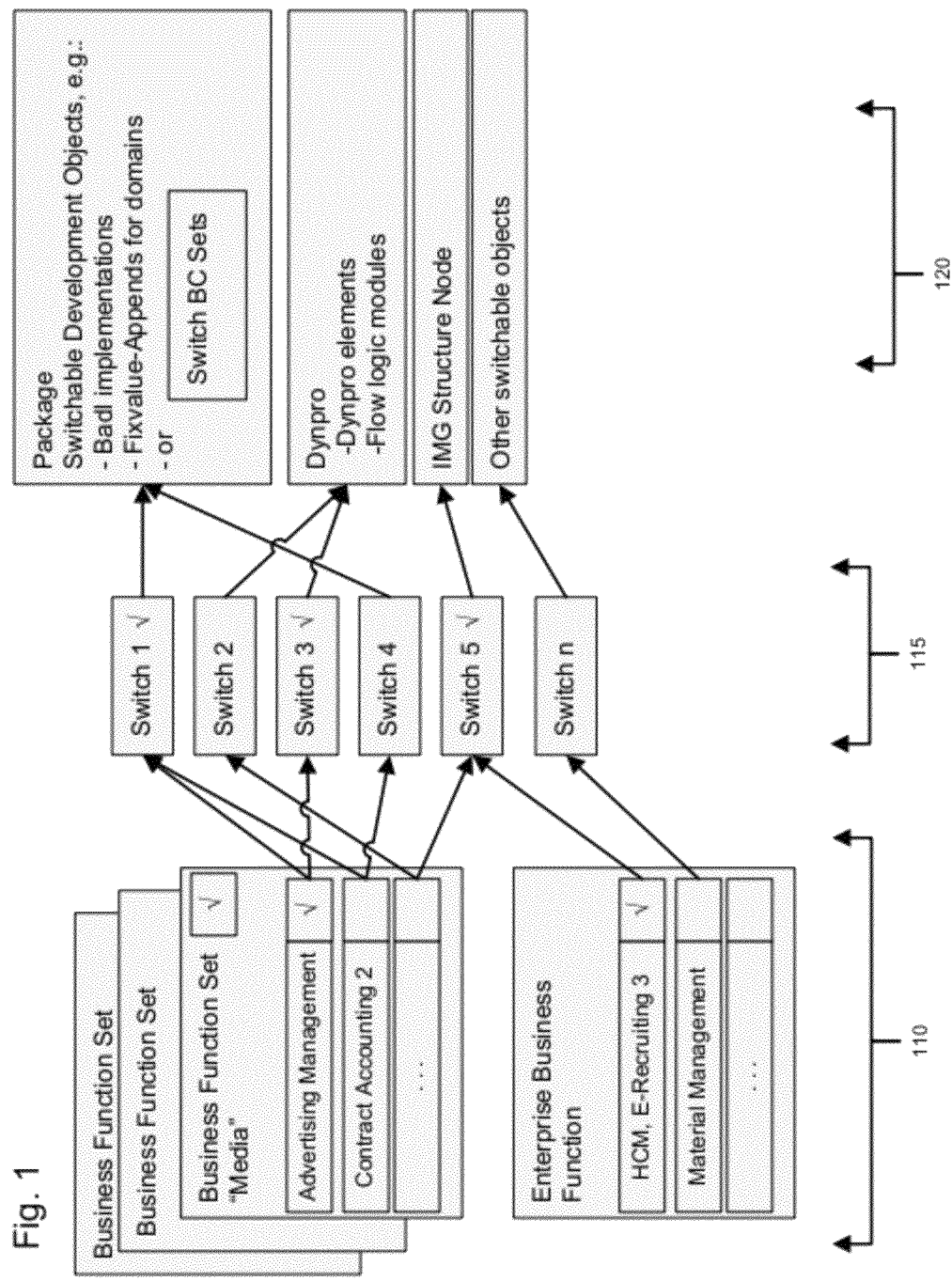
FIG. 1 illustrates an example switch framework, according to one example embodiment of the present invention.

FIG. 1 illustrates an example of the basic architecture of an example switch framework that may be used in a software suite to ensure enhancement package compliant development. On the left, at 110, there are the business functions and business function sets. Business functions (BF) may represent a set of new or changed functionality that is offered as a marketable unit within the enhancement packages. Business functions (which may also be referred to as "enhancement functions" in the context of an enhancement package) may be activated (e.g., switched on) by customers, so that the new functionality becomes visible and can be used in customers' systems. From a technical point of view the activation of a business function may activate switches (e.g., 115). Switches are the connecting part of business functions and development objects. Switches might not be visible to customers directly, and they may instead act 'behind the scenes.' Switches may be assigned to business functions and may activate/switch on when their associated business function gets switched on. On the other side, the development objects (e.g., 120) are assigned to switches and as soon as a switch gets switched on the development objects may become visible and active. Among the development objects is a specific type of development object called a switchable business configuration set ("Switch BC Set"). As a certain type of development object, the Switch BC Sets are therefore assigned to switches and become usable as soon as the assigned switch gets switched on. Making a Switch BC Set usable may include extracting it. The Switch BC Set may include a container of database table entries and these entries may be copied/extracted into the corresponding database table when the switch (to which the Switch BC Set is assigned to) is activated.

However, in this implementation it may be that it is not possible for customers to deactivate (switch off) some or all of the business functions once they are switched on. For customers this may mean that they are not able to test business functions in a convenient way before they decide to use them in the productive system. Even when some testing of reversible business functions is possible in the main test system, it may be required to do it in a separate client and stop any other test activity in the system. This could be because the status of a business function may always be set globally in a customer system so that this status is the same in every client in the system. Thus, continuing tests in the main test clients may mean that these tests are done in the environment of activated business functions which might get deactivated later. The test could therefore produce data which are no longer valid when this business function is deactivated which could make the whole main test client useless. Additionally, the original environment might be influenced by the activated business functions in a way that the results of the tests are not meaningful anymore.

One reason why so few business functions are reversible in current systems is because of the Switch BC Sets assigned to them. The Switch BC Sets are a way to deliver table entries assigned to business functions. They may act as containers that will be extracted when the function's assigned switch gets switched on. Once extracted it may not be possible to undo this, which means that the functions associated with that Switch BC Set are not reversible. Further, the containers may be extracted to a central client of a system, which may be used as a source to copy certain configuration settings to the other clients. Changing table entries in this central client can influence the whole system. Example embodiments of the present invention provide a new way to undo such changes and their impact to other clients. Additionally, example embodiments of the present invention allow reversible business functions to be tested without disrupting any of the other tests running on that system.

In order to increase the number of business functions that are reversible, example embodiments of the present invention create three tools for the enhancement package system. Example embodiments may include a new type of client, e.g., a business function reversibility test client. Additionally, example embodiments may include a Switch BC Set activation method when activating a business function in the reversibility test client. Finally, example embodiments may include a client specific, and optionally user-specific business function activation method in the business function reversibility test client.

The business function reversibility test client may behave similarly to already existing clients, but may differ in offering some specific behavior when activating business functions and Switch BC Set (as described further below). The main purpose of this type of client may be to test reversible business functions. Further, in a customer test system it may be possible to have more than one business function reversibility test client. This may be useful when different sets of business functions or different combinations of business functions are tested simultaneously. This business function reversibility test client may be recognized at runtime as a testing client. For example, there may be a table where all clients and their attributes are stored, and this table may be extended with a new fields/column which may be exclusively used to identify business function reversibility test clients. Additionally or alternatively, there may be a switch framework parameter table with a new parameter to hold the information about which clients in a system is the business function reversibility test client. While it may be a requirement to have the ability to identify which clients are business function reversibility test clients, this function may be implemented in any number of other ways, and only two illustrative examples are provided here.

In conjunction with the new business function reversibility test client, example embodiments may include business function sets (e.g., 110) that behave differently than they do in common clients, when activated in the BF reversibility test client. For example, once activated they may only be extracted into the BF reversibility test client and not in any other client (e.g., the template client). This may ensure that no other client will be affected by the business function set activation and by the test of the associated reversible business functions in the BF reversibility test client.

In cases where a business function has to be switched off after the test (e.g., because the test showed that the functionality offered with that business function is not needed etc.) the whole BF reversible test client may be deleted, including all data that were created during the test and including all table entries extracted through Switch BC Set activation. The deletion may be performed such that no other client will be affected. Deletion of a client is a standard procedure offered in existing systems. Likewise, copying or cloning a client is a standard procedure offered in existing systems. Thus, when other reversible business functions need to be tested a whole new BF reversibility test client may be setup, which may be a copy of the main test client of the system.

In cases where the business function proved worthy to be used in the actual productive system, it may be required that it be additionally activated in the other clients. This may be needed since the business function activation was previously restricted to the BF reversibility test client and may have been activated in a special way, e.g., as discussed below. Thus, the BF may need to be activated in the other clients in the system, but this may be done in the usual way. With the above described behavior, all business functions having Switch BC Sets may now be candidates to be reversible.

In addition to the specific behavior from activation of Switch BC Set in BF reversibility test clients, the whole activation of business functions may be different in this reversibility test client. The activation may be restricted to this client and optionally may be restricted even to specific users in this client. Further, it may be that the whole business function will not be activated, but only the switches of a business function. This means the status of the BF may remain inactive/switched off, but all of the switches assigned to the BF may be active/switched on in the BF reversibility client.

Example embodiments of the present invention may leverage certain preexisting tools (e.g., client creation/cloning and client deletion/removing procedures) to extend BF reversibility features into the client systems. A user may start the BF activation as usual in the transaction switch framework that supports the enhancement package platform with the Switch BC Set capabilities. This transaction may now recognize that it runs in a BF reversibility test client. The transaction may then give the user corresponding information, letting him/her know that the BF activation in this client will be different. It may be restricted such that only reversible BFs can be activated in this client and when a reversible one is selected and the activation is started a unique procedure may be executed.

Figure 2:
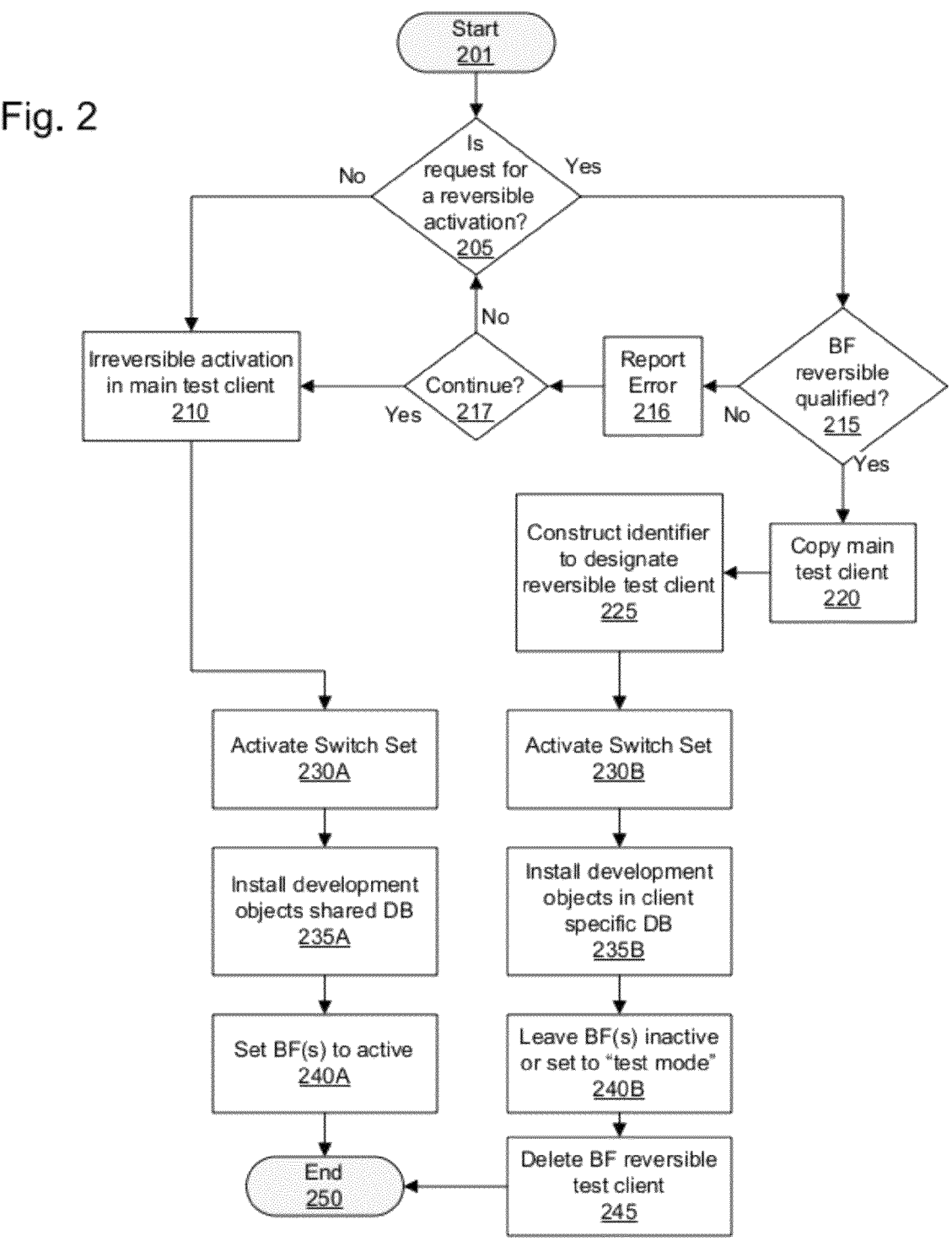
FIG. 2 illustrates an example reversible activation method, according to one example embodiment of the present invention.

FIG. 2 illustrates this new procedure as a reversible extension of the common enhancement package activation procedure. Starting with 201, a request to activate a business function may first be determined as reversible at 205, or regular, e.g., a normal activation of a BF or Switch BC Set, which may be irreversible. A user may specify that the BF or Switch BC Set should be activated in a reversible test client, or in other embodiments the user may specify activation in an existing reversible test client, thus indicating indirectly that the activation should be reversible. If the user indicates that reversible activation is not needed, the example procedure may begin a normal activation at 210, e.g., activation in the main test client or any other system client. However, if the user indicates that the activation should be performed in a business function reversibility test client, then the example procedure may test the indicated BF to determine if the BF qualifies. Since the reversibility is achieved, in part, by activating the switches, but leaving the actual BF as inactive (or "test mode active" which may mean active to the BF test client but inactive to all others), certain BFs may not be eligible for this type of an arrangement. For example, some business functions may have "after switch methods," or methods that must be activated after the associated switch is activated. Other conditions may also preclude a BF from being put in "test mode active," and thus, at 216, a user may be informed of the ineligibility. Further, at 217, a user may be asked if he or she would like to proceed with a regular activation in the main test client.

If, however, a BF is eligible for a BF reversibility test client, then at 220, a new BF reversibility test client may be created by cloning the main test client. In other embodiments the reversibility test client may already exist, e.g., because multiple reversible activations occur in a single test client. In order to ensure that the relevant Switch BC Set are only activated and installed in the BF reversibility test client, this test client should be uniquely identified among the other clients that generally have switches activated globally. At 225 an identifier may be constructed to designate this reversibility test client, e.g., via the client table method or added field method discussed above. At this point, e.g., 230 to 240, installation in the main test client and installation in the reversible test client may be fairly similar, but with some key differences.

First, at 230A and 230B, all switches of the business function to be activated may be selected and switched on. However, in the regular activation of development objects at 235A, the Switch BC Set may be activated globally and associated development objects may be activated globally in a database (DB) shared by all of the clients. In 235B, the Switch BC Set may be activated in a client specific way, installing development objects and BF data in a local, reversibility test client specific database. At 240A, activated BFs may be set to active, which may make them visible and active to every client in the system. At 240B, however, the 'activated' business function may get a new status in the switch framework, e.g., 'activated in test mode'. The business functions activated in this way may behave actively in the BF reversibility test client, but may not in any other client in the system. A BF reversible test client may remain active for any amount of time, but once testing is concluded the entire client may be deleted at 245.

Since the Switch BC Set were only activated in that client, and the BF remained in a globally inactive state, the deletion of the BF reversibility test client should leave the system in a state as if the BF was never activated at all. Thus, the BF may be 'deactivated' by this deletion, providing a sort of reversibility. The user may now decide to activate the BF in the regular system, which should behave exactly as it did in the BF reversibility test client (being a clone of the regular system main test client), or the user may postpone installation or run further tests. Further tests could be performed in a new BF reversibility test client or the original if not yet deleted. The example embodiment illustrated in FIG. 2 shows a serial execution, but in alternative embodiments it will be appreciated that several instances of the method may run in parallel, with some BFs being installing the main test client concurrently with tests being performed in one or more BF reversibility test clients.

In addition to client specific activation, example embodiments may provide a user specific activation. If the user specific switching option is used, the business function may behave in an active state only for the specified users and inactive for any others. With this it may be possible to semantically test independent business functions in the same BF reversibility test client. Users responsible for the tests of certain business functions may have them activated while other business functions remain inactive for that group of users. Customers may therefore not necessarily be forced to work with multiple BF reversibility test clients by using user specific activations within a single test client. A restriction to semantically independent business functions may be necessary to avoid interferences between business functions having dependencies. Such interferences may materially affect the test results. To test business functions from the same or a similar area of business another BF reversibility test client may be needed. This way it may be possible to test a certain combination of business functions of the business area in one client and another combination of business functions from the same area in another client. Customers might use this option to test which combination of business functions provides the best functionality for their specific system.

The business functions to be tested may stay inactive/ switched off, while only their switches get activated, and this may also be true for every other client in the system. Therefore, tests running in any other client will not be affected by this business function. This may allow parallel tests in the same system (but in different clients) which will not disrupt each other.

With the new type of client, the BF reversibility test client, there may be clear criterion in a customer system that can be used as a trigger for several specific behaviors related to activating business functions. This criterion may be used by the Switch BC Set activation as a signal that the activation has to be restricted to the BF reversibility test client, and it is also used by the business function activation as a signal to do a client specific—and optionally also a user specific—activation of the switches assigned to the business function. Activating Switch BC Set in a client specific way enables many additional business functions to be reversible and the specific BF activation enables customers to continue tests in the common test clients while testing reversible business function in a BF reversibility test client.

From a technical point of view users may be able to do the activation of reversible business functions as usual in the transaction switch framework, but by specifically doing the activation in a reversibility test client the activation may follow a different, more isolated procedure. As discussed, the business function itself may not be activated, but instead, only the associated switches of that business function may be activated. Further, the switches may not be activated as usual, but only activated for the BF reversibility test client in which the activation was started. Optionally it will be possible to do the activation only for a certain set of users. Using this user specific switching option may enable customers to test different (semantically independent) business functions in the same BF reversibility test client simultaneously. Working with multiple BF reversibility test clients may enable customers even to test different business functions which belong to the same area of business in parallel.

Figure 3:
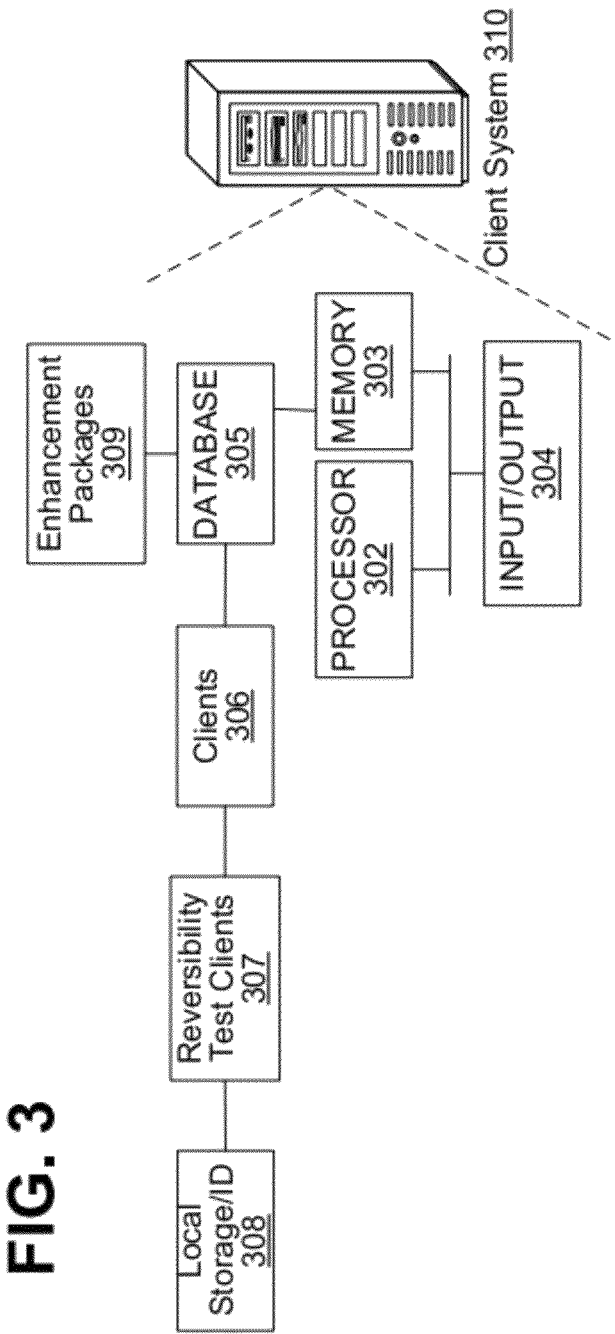
FIG. 3 illustrates an example system for executing a reversible activation method of a switch framework, according to one example embodiment of the present invention.

FIG. 3 illustrates one example system, according to an example embodiment of the present invention. The example may include one or more server computer systems, e.g., Client system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may be the globally accessible database storing and facilitating the various clients 306. Further, the clients may include BF reversibility test clients 307, which may have local storage 308 to isolate Switch BC Set activations from the global clients.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, by a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for providing reversible enhancement functions in a software system utilizing an enhancement package and switch framework, the method comprising:
constructing, with an electronic processor, a reversible test client by copying a main test client from an electronic storage medium, wherein the reversible test client including data created during a test is removable after the test;
enhancing the reversible test client with an identifier, such that it can be distinguished from other types of clients;
responsive to receiving a request to activate an enhancement function in the main test client:
    activating the enhancement function, activating an associated switch,
    responsive to activation of the enhancement function, activating a switchable business configuration set associated with the associated switch, wherein the activating includes installing at least one associated data or code set, the installation to be accessible to all clients, and
    setting a status for each enhancement function associated with the switchable business configuration set from inactive to active;
responsive to receiving a request to activate an enhancement function in the reversible test client:
    activating a switch associated with the enhancement function without activating the enhancement function,
    responsive to activation of the switch associated with the enhancement function, activating a switchable business configuration set associated with the switch, wherein the activating includes installing at least one associated data or code set in only the reversible test client, and
    setting the status for each enhancement function associated with the switchable business configuration set from "inactive" to "activated in test mode," wherein in the "activated in test mode" status the enhancement function continues to be inactive for all other clients, including the main test client, and active for the reversible test client;
receiving input indicating if an activation in the reversible test client should be accepted or rejected; and
responsive to the input indicating accepted: deleting the reversible test client, making the at least one associated data or code set accessible to all clients, and setting the status for each enhancement function form "activated in test mode" to activate.

2. The method of claim 1, further comprising:
checking the request to activate a switchable business configuration set in the reversible test client to ensure compatibility of associated enhancement functions.

3. The method of claim 2, wherein an enhancement function is incompatible if it includes methods that must be executed after a switch activation.

4. The method of claim 1, further comprising:
responsive to the input indicating rejected:
    deleting the reversible test client.

5. A non-transitory computer-readable storage medium encoded with instructions configured to be executed by a processor, the instructions which, when executed by the processor, cause the performance of a method, comprising:
constructing, with an electronic processor, a reversible test client by copying a main test client from an electronic storage medium, wherein the reversible test client including data created during a test is removable after the test;
enhancing the reversible test client with an identifier, such that it can be distinguished from other types of clients;

responsive to receiving a request to activate a switchable business configuration set in the main test client:
  activating the switchable business configuration set,
  installing at least one associated data or code set, the installation to be accessible to all clients, and
  automatically setting a status for each enhancement function associated with the switchable business configuration set from inactive to active;
responsive to receiving a request to activate a switchable business configuration set in the reversible test client:
  activating the switchable business configuration set,
  installing at least one associated data or code set in only the reversible test client, and
  automatically setting the status for each enhancement function associated with the switchable business configuration set from "inactive" to "activated in the test mode," wherein in the "activated in test mode" status the enhancement function continues to be inactive for all other clients, including the main test client, and active for the reversible test client;
receiving input indicating if an activation in the reversible test client should be accepted or rejected; and
  responsive to the input indicating accepted: deleting the reversible test client, making the at least one associated data or code set accessible to all clients, and setting the status for each enhancement function from "activated in test mode" to active.

6. The non-transitory computer-readable storage medium of claim 5, further comprising:
  checking the request to activate a switchable business configuration set in the reversible test client to ensure compatibility of associated enhancement functions.

7. The non-transitory computer-readable storage medium of claim 6, wherein an enhancement function is incompatible if it includes methods that must be executed after switchable business configuration set activation.

8. The non-transitory computer-readable storage medium of claim 5, further comprising:
  responsive to the input indicating rejected:
    deleting the reversible test client.

9. A system for providing reversible enhancement functions in a software system utilizing an enhancement package and switch framework, the system comprising:
  an electronic storage medium in communication with an electronic processor, the electronic processor configured to:
    construct a reversible test client by copying a main test client from the electronic storage medium, wherein the reversible test client including data created during a test is removable after the test;
    enhance the reversible test client with an identifier, such that it can be distinguished from other types of clients;
    receive a request to activate an enhancement function in the main test client, and in response:
      activate the enhancement function,
      activate a switch associated with the enhancement function,
      responsive to activation of the enhancement function, activate a switchable business configuration set associated with the switch, which includes installing at least one associated data or code set, the installation to be accessible to all clients, and
      set a status for each enhancement function associated with the switchable business configuration set from inactive to active;
    receive a request to activate an enhancement function in the reversible test client, and in response:
      activate a switch associated with the enhancement function without activating the enhancement function,
      responsive to activation of the switch associated with the enhancement function, activate a switchable business configuration set associated with the switch, including installing at least one associated data or code set in only the reversible test client, and
      set the status for each enhancement function associated with the switchable business configuration set from "inactive" to "activated in test mode," wherein in the "activated in test mode" the enhancement function continues to be inactive for all other clients, including the main test client, and active for the reversible test client;
    receive input indicating if an activation in the reversible test client should be accepted or rejected; and
    responsive to the input indicating accepted: delete the reversible test client, making the at least one associated data or code set accessible to all clients, and setting the status for each enhancement function form "activated in test mode" to active.

10. The system of claim 9, wherein the electronic processor is further configured to:
  check the request to activate a switchable business configuration set in the reversible test client to ensure compatibility of associated enhancement functions.

11. The system of claim 10, wherein an enhancement function is incompatible if it includes methods that must be executed after a switch activation.

12. The system of claim 9, wherein the electronic processor is further configured to:
  responsive to the input indicating rejected:
    delete the reversible test client.

* * * * *